United States Patent [19]

Fujioka et al.

[11] Patent Number: 5,755,861
[45] Date of Patent: May 26, 1998

[54] INK COMPOSITION, PROCESS FOR ITS PREPARATION, AND INK-JET RECORDING PROCESS

[75] Inventors: Masaya Fujioka; Hideto Yamazaki, both of Nagoya; Hidemasa Sawada, Gifu; Masahito Kato, Nagoya, all of Japan

[73] Assignee: Brother Kogyo Kabushiki Kaisha, Nagoya, Japan

[21] Appl. No.: 645,808

[22] Filed: May 14, 1996

[30] Foreign Application Priority Data

| May 19, 1995 | [JP] | Japan | 7-121163 |
|---|---|---|---|
| May 19, 1995 | [JP] | Japan | 7-121164 |
| May 19, 1995 | [JP] | Japan | 7-121165 |
| May 19, 1995 | [JP] | Japan | 7-121166 |
| May 19, 1995 | [JP] | Japan | 7-121167 |
| May 19, 1995 | [JP] | Japan | 7-121168 |

[51] Int. Cl.$^6$ ............................................. C09D 11/02
[52] U.S. Cl. ........................ 106/31.87; 106/31.32; 106/31.6; 106/31.67
[58] Field of Search ................ 106/31.27, 31.32, 106/31.6, 31.64

[56] References Cited

U.S. PATENT DOCUMENTS

| 4,339,763 | 7/1982 | Kyser et al. | 346/140 R |
|---|---|---|---|
| 4,683,002 | 7/1987 | Mirua et al. | 106/31.27 |
| 4,732,613 | 3/1988 | Shioya et al. | 106/31.27 |
| 4,867,789 | 9/1989 | Eida et al. | 106/31.32 |
| 5,016,028 | 5/1991 | Temple | 346/140 R |
| 5,358,558 | 10/1994 | Yamamoto et al. | 106/31.47 |
| 5,584,918 | 12/1996 | Suzuki et al. | 106/31.47 |
| 5,605,566 | 2/1997 | Yui et al. | 106/31.58 |
| 5,637,138 | 6/1997 | Yamazaki | 106/31.32 |
| 5,637,140 | 6/1997 | Fujioka | 106/31.37 |
| 5,645,630 | 7/1997 | Yamazaki | 106/31.32 |
| 5,645,631 | 7/1997 | Koike et al. | 106/31.37 |

FOREIGN PATENT DOCUMENTS

| 53-12138 | 4/1978 | Japan. |
|---|---|---|
| A-57-185366 | 11/1982 | Japan. |
| A-61-113668 | 5/1986 | Japan. |
| A-62-101672 | 5/1987 | Japan. |
| A-1-204980 | 8/1989 | Japan. |
| 2-2906 | 1/1990 | Japan. |
| A-2-150355 | 6/1990 | Japan. |
| B2-3-48951 | 7/1991 | Japan. |
| B2-3-48952 | 7/1991 | Japan. |
| B2-3-48953 | 7/1991 | Japan. |
| A-4-356569 | 12/1992 | Japan. |

*Primary Examiner*—Helene Klemanski
*Attorney, Agent, or Firm*—Oliff & Berridge, PLC

[57] ABSTRACT

In an ink composition comprising a water-soluble dye or a pigment, dissolved or dispersed in an aqueous medium, the ink composition fulfills at least one of the following conditions 1 to 6 in respect of the concentration of metals contained therein:

Condition 1; Barium concentration, not more than 4 ppm
Condition 2; Zinc concentration, less than 1 ppm
Condition 3; Nickel concentration, less than 0.05 ppm
Condition 4; Strontium concentration, less than 0.01 ppm
Condition 5; Iron concentration, not more than 0.3 ppm
Condition 6; Silicon concentration, less than 1.5 ppm.

14 Claims, No Drawings

INK COMPOSITION, PROCESS FOR ITS PREPARATION, AND INK-JET RECORDING PROCESS

BACKGROUND OF THE INVENTION

1. Field of the Invention

This invention relates to an ink composition suited for ink-jet recording, a process for its preparation, and an ink-jet recording process carried out using the ink composition.

2. Description of the Related Art

As ink-jet recording systems, ink ejection systems are known in the art as exemplified by a system utilizing electrostatic attraction, a system in which mechanical vibration or displacement is imparted to ink by the use of a piezoelectric device, and a system in which ink is heated to cause it to bubble and a pressure produced when it bubbles is utilized. Ink droplets are formed by some of these ink ejection systems, and part or the whole of the droplets is caused to adhere to recording mediums such as paper to make a record. When writing implements such as fountain pens, felt-tip pens and ball-point pens are used, ink is ejected from capillaries and the ink thus ejected is received on recording mediums to make a record.

As inks used in such ink-jet recording systems or writing implements, those prepared by dissolving or dispersing a water-soluble dye or a pigment in water or an aqueous medium comprising water and a water-soluble organic solvent are known and put into use.

In such conventional inks, they are of course required to have various performances. In particular, the performance most required is the liquid stability that the ink does not cause clogging of, and deposits at, nozzles or orifices of recording apparatus or pen points when something is being recorded using ink, when the recording is paused and also when the recording is stopped over a long period of time. Especially in the ink-jet recording systems, the apparatus are expensive compared with the writing implements, and hence it is important to prevent ink-jet nozzles or orifices from clogging. Moreover, in the ink-jet recording systems, if the nozzles or orifices are not even clogged, faulty images due to a curved jet, a change in ink drop quantity and a change in flying speed which are caused by the deposits formed at the nozzles or orifices have caused a great problem. Furthermore, among the ink-jet recording systems, the thermal ink-jet recording system that utilizes heat energy tends to cause deposition of foreign matter on the surface of a heating element as a result of temperature changes, and the problem is more important.

In conventional ink compositions, however, some additives are necessary to meet various conditions such as ink ejection conditions, long-term storage stability, sharpness and density of images at the time of recording, surface tension, electrical properties and so forth. Such additives contain various impurities.

As well known, commercially available dyes or pigments used as ink materials also contain many impurities (e.g., organic matter and inorganic matter such as dispersants and leveling agents). Ink components other than the dyes or pigments, as exemplified by water and water-soluble organic solvents, also contain not a little organic or inorganic impurities. Still also, during the manufacture of inks, various impurities may be included because of containers or implements used and environmental factors.

Under such circumstances, it has been attempted to solve the above problems by controlling the quantity of the impurities in ink that may cause the deposits.

For example, Japanese Patent Publication No. 3-48951 discloses a liquid composition containing a water-soluble dye used in ink-jet recording and in which iron and silicon contained therein are controlled to be in a content not more than 9 ppm in total. Japanese Patent Publication No. 2-2906 also discloses an ink-jet recording ink mainly composed of an aqueous solution containing a water-soluble acid dye or water-soluble direct dye having been subjected to an ion-exchange treatment by the use of a cationic ion-exchange resin.

Such conventional impurity-controlled inks are more improved than inks containing impurities in excess. However, they have not necessarily been well effective when, for example, even the long-term storage of inks and the changes in temperature and environment are taken into account.

SUMMARY OF THE INVENTION

The present invention was made in order to solve the problems discussed above. Accordingly, an object of the present invention is to provide an ink composition that may cause no clogging of nozzles, orifices or ink channels in the heads of ink-jet printers or the like, may cause no faulty prints due to a curved jet, a change in ink drop quantity and a change in flying speed and also may cause no formation of deposits on the heating elements of ink-jet printers utilizing heat energy, when used, when stored for a long term and even when undergoes changes in temperature and environment.

To achieve the above object, the present inventors made extensive studies. Since the impurities contained in inks cause the above problems, they studied various effects or influences of such impurities. As the result, they have discovered that the clogging of nozzles, orifices or ink channels in the heads of ink-jet printers or the like, the curved jet, the change in ink drop quantity, the change in flying speed and the deposits formed during the storage of inks are mostly caused by barium, zinc, nickel, strontium, iron or silicon included in inks, and that the above various problems can be solved when an ink whose impurities having been controlled to be not more than a specific concentration is used. Thus, they have accomplished the present invention.

The present invention provides an ink composition comprising a water-soluble dye or a pigment, dissolved or dispersed in an aqueous medium, wherein the ink composition fulfills at least one of the following conditions 1 to 6 in respect of the concentration of metals contained therein:

Condition 1; Barium concentration, not more than 4 ppm
Condition 2; Zinc concentration, less than 1 ppm
Condition 3; Nickel concentration, less than 0.05 ppm
Condition 4; Strontium concentration, less than 0.01 ppm
Condition 5; Iron concentration, not more than 0.3 ppm
Condition 6; Silicon concentration, less than 1.5 ppm.

The present invention also provides a process for preparing an ink composition comprising a water-soluble dye or a pigment, dissolved or dispersed in an aqueous medium; the process comprising the steps of dissolving or dispersing the water-soluble dye or the pigment in the aqueous medium, and subjecting the resulting solution or dispersion to a cation-exchange treatment by the use of a cation-exchange resin to obtain an ink composition that fulfills at least one of the above conditions 1 to 6 in respect of the concentration of metals contained therein.

The present invention still also provides an ink-jet recording process carried out by jetting an ink composition to a recording medium in the form of droplets to make a record, wherein the ink composition comprises a water-soluble dye or a pigment, dissolved or dispersed in an aqueous medium, and fulfills at least one of the above conditions 1 to 6 in respect of the concentration of metals contained therein.

In the present invention, the ink composition need not fulfill all the conditions 1 to 6, and may fulfill at least one of them in any combination among the conditions 1 to 6. In particular, it is preferable for the ink composition to fulfill all the conditions 1 to 6 at the same time.

These and other features and advantages of the present invention are described in or will become apparent from the following detailed description of the preferred embodiments.

DESCRIPTION OF THE PREFERRED EMBODIMENTS

The ink composition of the present invention is characterized in that the concentration of specific metals, i.e., the concentration of barium, zinc, nickel, strontium, iron or silicon is controlled to be not more than a specific value. This makes it possible to prevent clogging of nozzles, orifices or ink channels in the heads of ink-jet printers or the like, faulty prints due to a curved jet, a change in ink drop quantity and a change in flying speed and also prevent formation of deposits on the heating elements of ink-jet printers utilizing heat energy, when the ink composition is used, when stored for a long term and even when undergoes changes in temperature and environment.

In this ink composition of the present invention, at least one of the following conditions 1 to 6 may be fulfilled in respect of the concentration of such metals.

Condition 1: Barium concentration, not more than 4 ppm
Condition 2: Zinc concentration, less than 1 ppm
Condition 3: Nickel concentration, less than 0.05 ppm
Condition 4: Strontium concentration, less than 0.01 ppm
Condition 5: Iron concentration, not more than 0.3 ppm
Condition 6: Silicon concentration, less than 1.5 ppm Thus, the ink composition of the present invention embraces an embodiment where the condition 1 is fulfilled (preferably an embodiment where barium is not more than 0.01 ppm), an embodiment where the condition 2 is fulfilled, an embodiment where the condition 3 is fulfilled, an embodiment where the condition 4 is fulfilled, an embodiment where the condition 5 is fulfilled, and an embodiment where the condition 6 is fulfilled. The ink composition of the present invention may also embrace an embodiment where any two or more of the conditions 1 to 6 are fulfilled, and, in particular, an embodiment where all the conditions 1 to 6 are fulfilled at the same time.

Basic components that make up the ink composition of the present invention will be described below.

As such basic components, those conventionally used in ink composition for ink-jet recording may be used.

For example, the dye includes water-soluble dyes as typified by direct dyes, acid dyes, basic dyes and reactive dyes. In particular, as those preferable for inks used in the ink-jet recording systems and satisfying sharpness, water-solubility, stability, light-fastness and other required performances, the dye includes, for example, C.I. Direct Black 17, 19, 32, 51, 71, 108, 146, 154, 168; C.I. Direct Blue 6, 22, 25, 71, 86, 90, 106, 199; C.I. Direct Red 1, 4, 17, 28, 83, 227; C.I. Direct Yellow 12, 24, 26, 86, 98, 142; C.I. Direct Orange 34, 39, 44, 46, 60; C.I. Direct Violet 47, 48; C.I. Direct Brown 109; C.I. Direct Green 59; C.I. Acid Black 2, 7, 24, 26, 31, 52, 63, 112, 118; C.I. Acid Blue 9, 22, 40, 59, 93, 102, 104, 113, 117, 120, 167, 229, 234; C.I. Acid Red 1, 6, 32, 37, 51, 52, 80, 85, 87, 92, 94, 115, 181, 256, 289, 315, 317; C.I. Acid Yellow 11, 17, 23, 25, 29, 42, 61, 71; C.I. Acid Orange 7, 19; C.I. Acid Violet 49; C.I. Basic Black 2; C.I. Basic Blue 1, 3, 5, 7, 9, 24, 25, 26, 28, 29; C.I. Basic Red 1, 2, 9, 12, 13, 14, 37; C.I. Basic Violet 7, 14, 27; and C.I. Food Black 1, 2.

The foregoing examples of the dye are examples particularly preferred for the ink composition of the present invention. In the present invention, examples are by no means limited to these dyes.

As the pigment, carbon black and besides many inorganic pigments and organic pigments may be used. For example, it may include azo pigments such as azo lakes, insoluble azo pigments, condensed azo pigments and chelate azo pigments, polycyclic pigments such as phthalocyanine pigments, perylene and perynone pigments, anthraquinone pigments, quinacridone pigments, dioxazine pigments, thioindigo pigments, isoindolinone pigments and quinophthalone, dye lakes such as basic dye lakes and acid dye lakes, organic pigments such as nitro pigments, nitroso pigments and aniline black daylight fluorescent pigments, and inorganic pigments such as titanium oxide and carbon black type ones. Other pigments may also be used so long as they are dispersible in an aqueous phase. Those obtained by surface-treating these pigments with a surface active agent or a polymeric dispersant, as exemplified by graft carbon, may also be used.

The foregoing examples of the pigment are examples particularly preferred for the ink composition of the present invention. In the present invention, examples are by no means limited to these dyes.

When the above pigment is used as a colorant of the present invention, it is dispersed by a conventionally known method together with suitable dispersant, solvent, pure water and optionally other additives.

As the dispersant, surface active agents or polymeric dispersants as disclosed in, for example, Japanese Patent Application Laid-open No. 62-101672 may be used. The polymeric dispersants include anionic polymeric dispersants as exemplified by proteins such as gelatin and albumin, natural rubbers such as gum arabic and tragacanth rubber, glucosides such as saponin, cellulose derivatives such as methyl cellulose, carboxyl cellulose and hydroxymethyl cellulose, natural polymers such as lignin sulfonate and shellac, polyacrylates, salts of a styrene-acrylic acid copolymer, salts of a vinylnaphthalene-acrylic acid copolymer, salts of a styrene-maleic acid copolymer, salts of a vinylnaphthalene-maleic acid copolymer, sodium salt of a formalin condensate with β-naphthalenesulfonic acid, and phosphates; and nonionic polymeric dispersants such as polyvinyl alcohol, polyvinyl pyrrolidone and polyethylene glycol. The surface active agents include anionic surface active agents such as fatty acid salts, higher alcohol sulfuric acid ester salts, liquid fatty oil sulfuric acid ester salts and alkylallylsulfonic acid salts, and nonionic surface active agents such as polyoxyethylene alkyl ethers, polyoxyethylene alkyl esters, sorbitan alkyl esters and polyoxyethylene sorbitan alkyl esters. One or more kinds of these may be used under appropriate selection. The dispersant may preferably be used in an amount of usually from 1 to 20% by weight based on the total weight of the ink composition.

Meanwhile, a dispersion machine used to disperse the pigment may include any of those commonly available as dispersion machines, as exemplified by ball mills, roll mills and sand mills. In particular, a high-speed sand mill is especially preferred.

The dye and the pigment may each be used alone, or may be used as a mixture of two or more kinds of dyes, pigments, or dyes and pigments in combination.

The dye and/or the pigment may be used in an amount of usually from 0.1 to 20% by weight, and preferably from 0.3 to 15% by weight, based on the weight of the ink composition of the present invention.

The aqueous medium used in the ink composition of the present invention and used in the present invention may be water, or a mixed solvent of water and a water-soluble organic solvent. Particularly preferably, it may be a mixed solvent of water and a water-soluble organic solvent. The water-soluble organic solvent includes those having a drying-preventive (wetting) effect. As the water, it is preferable to use not commonly available water containing various ions but deionized water.

The water-soluble organic solvent used as its mixture with water may include, for example, alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol;

alkylene glycols whose alkylene group has 2 to 6 carbon atoms, such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol and hexylene glycol; glycerol; lower alkyl ethers of polyhydric alcohols, such as ethylene glycol methyl (ethyl, n-propyl, isopropyl, n-butyl or isobutyl) ether, propylene glycol methyl (ethyl, n-propyl, isopropyl, n-butyl or isobutyl) ether, diethylene glycol methyl (ethyl, n-propyl, isopropyl, n-butyl or isobutyl) ether, dipropylene glycol methyl (ethyl, n-propyl, isopropyl, n-butyl or isobutyl) ether, triethylene glycol methyl (ethyl, n-propyl, isopropyl, n-butyl or isobutyl) ether, and tripropylene glycol methyl (ethyl, n-propyl, isopropyl, n-butyl or isobutyl) ether; pyrrolidones such as 2-pyrrolidone and N-methyl-2-pyrrolidone; and 1,3-dimethyl-2-imidazolidinone. Of these many water-soluble organic solvents, polyhydric alcohols such as diethylene glycol and glycerol, and lower alkyl ethers of polyhydric alcohols, such as triethylene glycol monomethyl (monoethyl, mono-n-propyl, monoisopropyl, mono-n-butyl or monoisobutyl) ether are preferred.

The water-soluble organic solvent may be contained in the ink composition in an amount of usually from 0 to 95% by weight, preferably from 10 to 80% by weight, and more preferably from 20 to 50% by weight, based on the total weight of the ink composition.

When this water-soluble organic solvent is used, the content of the water may be determined within a vast range, depending on the type of component of the water-soluble organic solvent, the composition thereof and the desired properties of ink, and may be within the range of usually from 10 to 100% by weight, preferably from 10 to 75% by weight, and more preferably from 20 to 70% by weight, based on the total weight of the ink composition.

The process for preparing the ink composition of the present invention will be specifically described below.

In the case of the dye, first, sodium sulfate is added to an aqueous solution of the dye in a desired concentration to subject the dye to a salting-out treatment. Next, the precipitate thus formed is collected by filtration, and this is washed with a saturated aqueous solution of sodium sulfate, followed by drying. The dried solid matter thus obtained is dissolved in a stated quantity in the water-soluble organic solvent, and thereafter the aqueous solution formed is filtered to obtain a filtrate. The water-soluble organic solvent used here may be any solvent so long as it is a bad solvent to sodium sulfate and also a good solvent to the dye. Any solvent may be selected as an optimum solvent taking account of the structure of the dye to be treated. Usually, alcohols, glycols, glycol ethers may preferably be used. The filtrate thus obtained is optionally left to stand for 1 to 10 days to carry out re-filtration.

Next, to the filtrate obtained, a stated amount of water is added, followed by stirring, and then passed through a cation-exchange resin layer. Thereafter, additives are optionally added, followed by stirring. Thus, the ink composition is made up. Before it is used, the content of the specific metals such as barium in the ink composition is measured using a plasma emission spectroscopic analyzer to confirm whether or not the ink composition fulfills at least one of the conditions 1 to 6.

In the procedure described above, for the treatment of the dye, the first salting-out treatment is chiefly in order to remove sodium chloride which is a typical impurity contained in a large quantity in usual commercially available dyes. The subsequent treatment with the water-soluble organic solvent is in order to remove both the sodium sulfate originally contained and the sodium sulfate added in a large quantity in the above salting out. The filtration of the filtrate formed after the first filtration, carried out after the filtrate has been left to stand for a long time, is chiefly in order to remove colloidal matter containing the specific metals such as barium contained in the solution. The treatment subsequently carried out using the cation-exchange resin is chiefly in order to remove the specific metals such as barium contained in the solution.

In the foregoing, a method for controlling the content of the specific metals such as barium contained in the ink composition is shown. Methods for such control are by no means limited to this method, and all methods can be effectively used so long as they are methods by which the specific metals such as barium in an ionized form or specific metal compounds such as barium compounds in a colloidal form can be removed. For example, it is possible to use aeration, coagulation precipitation making use of a coagulant, filtration, lime softening, electrolysis, or the like.

Here, it should be taken into consideration that containers and implements used in the step of salting out the dye and the step of preparing the ink composition are made of materials selected so that they can be free from contamination by various impurity species including the specific metals such as barium, and they are cleaned accordingly and rinsed with pure water so that dust can be prevented from unwantedly entering from the external environment.

In the case of the pigment, the impurities including the specific metals such as barium contained in the pigment itself can be almost removed by stirring the pigment together with pure water followed by filtration, and repeating these steps several times. In the step of preparing the ink composition, too, including the step of dispersing the pigment, it should also be taken into consideration that, like the case of the dye, containers and implements are made of materials selected so that they can be free from contamination by various impurity species including the specific metals such as barium, and they are cleaned accordingly and rinsed with pure water so that dust can be prevented from unwantedly entering from the external environment. Before the ink composition thus obtained is used, the content of the specific metals such as barium contained therein is measured to confirm whether or not the ink composition fulfills any of the conditions 1 to 6.

The sources from which the specific metals such as barium come as impurities are the dye, the pigment, the containers, the implements and the external environment. Other than these, water used is considered as a source. As the water used for the ink composition, treated water such as distilled water or ion-exchanged water or combination of these may be used, whereby such impurities can be prevented from entering. The greatest sources from which the specific metals such as barium come are the dye and pigment used. They are often contained in a very large quantity especially in the case of commercially available products. For example, in a dye powder, the content of nickel is of the order of hundreds ppm, and that of zinc, thousands ppm in some cases.

In the foregoing, the removal of the specific metals such as barium contained in the ink composition has been chiefly described. In practice, together with the removal of such metals, it is preferable to also remove various inorganic salts such as sodium chloride, sulfates and sodium salts, as well as calcium, magnesium and so forth.

The ink composition of the present invention and used in the present invention is basically constituted as described above. Besides, various dispersants, surface active agents, viscosity modifiers, surface tension modifiers, pH adjusters, antiseptic antifungal agents known in the art may be optionally added.

When an ink composition is prepared which is used in an ink-jet recording process of the type a recording solution is charged, a specific resistance modifier including inorganic salts such as lithium chloride, ammonium chloride and sodium chloride is added.

When the ink composition is used in the ink-jet recording of the type the ink is ejected by the action of heat energy, thermal properties (e.g., specific heat, coefficient of thermal expansion, and thermal conductivity) are controlled in some cases.

The ink composition used in the present invention, obtained in the manner as described above, has well solved the problems involved in the prior art, and is for itself advantageous as having well balanced performances in respect of all of recording performances in ink-jet recording (e.g., signal response, stability in droplet formation, long-time continuous recording performance, and ink ejection stability after long-time pause), storage stability, fixing performance to recording mediums, recorded image light-fastness, water resistance and so forth. It can be useful as ink for ink-jet recording of various systems, can also be preferable as ink for the ink-jet recording system in which the ink composition is jetted in the form of droplets by the vibration of a piezoelectric device and the ink-jet recording system in which the ink composition is jetted in the form of droplets by utilizing the action of heat energy, the latter ink-jet recording system being easily affected by the formation of deposits, and can enjoy superior recording.

EXAMPLES

Examples in which the present invention is embodied will be given below.

In the following description, "%" and "parts" are by weight.

Example A1

An aqueous 10% solution of a commercially available dye SYRUS SUPRARED F3B (trade name; available from Bayer Japan Ltd.) was prepared, and then sodium sulfate was added to the aqueous solution, followed by stirring to salt out the dye. The precipitate formed was collected by filtration, which was then washed with a saturated pure water solution of sodium sulfate, followed by drying.

The dry solid matter obtained was weighed in a stated amount so as to be in a dye concentration of 3% in the resulting ink composition, and this was dissolved in a solution of 3:1 mixture of ethylene glycol and N-methyl-2-pyrrolidone. Next, the solution obtained was pressure filtered with a membrane filter of 0.8 µm in average pore diameter. Thereafter the filtrate formed was hermetically enclosed in a plastic container, and left to stand for 3 days in a cool and dark place. Then, the resulting filtrate was again filtered with a membrane filter of 0.8 µm. To 40 parts of the filtrate thus obtained, 60 parts of water was added to obtain an ink composition.

Subsequently, the ink composition was passed through a layer of a cation-exchange resin C-464, available from Sumitomo Chemical Co., Ltd. Thereafter, the solution having been passed therethrough was adjusted to have a pH of 9.8 using an aqueous 0.1N sodium hydroxide solution. All the containers and implements used in the preparation of the ink composition were all made of glass, Teflon, polyethylene or polypropylene, and were used after they were thoroughly cleaned with washing water and rinsed with pure water, followed by complete drying.

Barium content in this ink composition was measured using a plasma emission spectroscopic analyzer ICPS-1000-4, trade name, manufactured by Shimadzu Corporation to reveal that it was 0.008 ppm.

Using this ink composition, the following T1 to T5 were examined on a recording apparatus having an on-demand type multi-head that performs recording by imparting heat energy to the ink in the recording head to produce ink droplets (ejection orifice diameter: 35 µm; heating resistor resistance value: 150 ohms; drive voltage: 30 volts; frequency: 2 KHz) or a recording apparatus having an on-demand type multi-head that performs recording by imparting pressure produced by piezoelectric vibration, to the ink in the recording head to produce ink droplets (ejection orifice diameter: 40 µm; drive voltage: 30 volts; frequency: 10 KHz), to find that good results were obtained in all the cases as noted below together.

(T1) Long-term stability: The ink composition was hermetically enclosed in a bag made of plastic film, and stored at –30° C. or 60° C. for 6 months. Even after such storage, deposition of insoluble matter was not seen, and any changes in liquid properties and color tones were also not seen.

(T2) Ejection stability: The ink composition was continuously ejected in an atmosphere of room temperature, 5° C. or 40° C., for 24 hours for each. Always stable, high-quality recording was performed in all atmospheres.

(T3) Ejection response: Ejection intermittently carried out at intervals of 2 second and ejection after leaving for 2 months were examined. In both instances, no clogging occurred at the orifice tips, and stable and uniform recording was performed.

(T4) Quality of recorded images: Images recorded on the recording mediums shown below had a high density and were sharp. After the images were exposed to room light for 6 months, their densities decreased by 1% or less.

Recording mediums

Woodfree paper GINKAN, trade name, available from Sanyo Pulp Co., Ltd.

Woodfree paper SEVEN STAR, trade name, available from Hokuetsu Paper Co., Ltd.

Mechanical woodpulp paper HAKUBOTAN, trade name, available from Honshu Paper Co., Ltd.

Non-size paper TOYO ROSHI No.4, trade name, available from Toyo Roshi Co., Ltd.

(T5) Fixing performance on each kind of recording medium: Five seconds after printing on the recording medium shown in the above (T4), print areas were rubbed with fingers to examine whether or not images were rubbed off or blurred. As the result, images were neither rubbed off nor blurred in all instances, showing a superior fixing performance.

Examples A2 to A4

Ink compositions were prepared in the same manner as in Example A1 except that the following commercially available dyes were used, and T1 to T5 of the respective ink compositions were examined in the same manner as in Example A1. Like those in Example A1, these ink compositions showed good results.

Example A2

WATER YELLOW 6 (trade name; available from Orient Chemical Industries Ltd.). Barium content in the ink composition, controlled to 0.003 ppm.

Example A3

LEVASEL FAST BLUE KS6GLL (trade name; available from Bayer Japan Ltd.). Barium content in the ink composition, controlled to 0.005 ppm.

Example A4

SPECIAL BLACK 7984 (trade name; available from Bayer Japan Ltd.). Barium content in the ink composition, controlled to 0.007 ppm.

Example A5

Using respectively the ink composition of Example A1 as magenta ink, the ink composition of Example A2 as yellow ink, the ink composition of Example A3 as cyan ink and the ink composition of Example A4 as black ink, full-color photographic images were reproduced on the same ink-jet recording apparatus as used in Examples A1 to A4. Images obtained were very sharp and their colors were well reproduced.

Examples A6 to A8

Using the same commercially available dyes as used in Examples A1 to A4, ink compositions were prepared in the same manner as in Example A1 except that the filtration and re-filtration in the preparation of the ink composition were carried out using a membrane filter of 3 μm in average pore diameter. T1 to T5 of the respective ink compositions thus prepared were examined in the same manner as in Example A1. As the result, like those in Example A1, these ink compositions showed good results in respect of T1, T2, T4 and T5. In respect of T3, a curved jet and a change in flying speed were slightly observed at the ejection after leaving for 2 months, but the original state was restored immediately after the printing was started.

Example A6

WATER YELLOW 6 (trade name; available from Orient Chemical Industries Ltd.). Barium content in the ink composition, controlled to 1 ppm.

Example A7

LEVASEL FAST BLUE KS6GLL (trade name; available from Bayer Japan Ltd.). Barium content in the ink composition, controlled to 2 ppm.

Example A8

SPECIAL BLACK 7984 (trade name; available from Bayer Japan Ltd.). Barium content in the ink composition, controlled to 3 ppm.

Example A9

Pigment carbon black and a 100-fold amount of pure water were stirred for 1 hour, and the mixture was filtered three times, followed by drying. Using this filtered product, a liquid composition having the composition shown below was prepared, and was subjected to dispersion by means of a dispersion machine PEARL MILL (trade name, manufactured by Ashizawa K.K.) to obtain a dispersion.

As grinding media put in the dispersion machine, zirconia beads were used. At the parts coming in contact with liquid in the dispersion machine, those subjected to ceramic coating were used. Other containers and implements were those made of the same material as in Example A1, and were used after they were cleaned and then rinsed with pure water, followed by complete drying. Liquid composition:

| | |
|---|---|
| Carbon black (MA-7, available from Mitsubishi Chemical Industries Limited) | 10% |
| Styrene-maleic anhydride copolymer (molecular weight: 10,000; acid value: 175) | 7% |
| Glycerol | 5% |
| NIKKOL TS-30 (trade name; available from Nikko Chemicals Co., Ltd.) | 2% |
| Pure water | 75% |
| Triethanolamine | 1% |

Next, this dispersion was treated by a centrifugal separator to remove coarse particles, and then the resulting dispersion was pressure filtered with a membrane filter of 1 μm in average pore diameter. Thereafter the filtrate formed was hermetically enclosed in a plastic container, and left to stand for 3 days in a cool and dark place. Then, the resulting filtrate was again filtered with a membrane filter of 1 μm to obtain an ink composition. Barium content in the ink composition thus prepared was measured in the same manner as in Example A1 to reveal that it was 0.009 ppm. T1 to T5 of this ink composition were examined in the same manner as in Example A1. Like those in Example A1, the ink composition showed good results.

Comparative Examples A1 to A4

Using the same commercially available dyes as used in Examples A1 to A4, ink compositions were prepared in the same manner as in Example A1 except that the filtration in the preparation of the ink composition was carried out using a membrane filter of 3 μm in average pore diameter and the re-filtration was not carried out. T1 to T5 of the respective ink compositions thus prepared were examined in the same manner as in Example A1. As the result, deposition of insoluble matter was seen in respect of T1. In respect of T2 and T3, clogging, curved jets and changes in flying speed were frequently observed, and the original state was not restorable.

Comparative Example A1

SYRUS SUPRARED F3B (trade name; available from Bayer Japan Ltd.). Barium content in the ink composition, controlled to 6 ppm.

Comparative Example A2

WATER YELLOW 6 (trade name; available from Orient Chemical Industries Ltd.). Barium content in the ink composition, 7 ppm.

Comparative Example A3

LEVASEL FAST BLUE KS6GLL (trade name; available from Bayer Japan Ltd.). Barium content in the ink composition, 8 ppm.

Comparative Example A4

SPECIAL BLACK 7984 (trade name; available from Bayer Japan Ltd.). Barium content in the ink composition, 10 ppm.

As is clear from the foregoing description, in the case of the ink compositions of Example A1 to A6 and the ink-jet recording carried out using them, barium contained in the ink compositions is in a content not more than 4 ppm, and preferably not more than 0.01 ppm. Hence, good printing can be enjoyed without causing the clogging of nozzles or orifices and the faulty prints due to a curved jet, a change in ink drop quantity and a change in flying speed, when the ink composition are used, when stored for a long term and even when undergo changes in temperature and environment. Also, when the ink compositions of Example A1 to A6 are used in the ink-jet recording system utilizing heat energy, the deposits on the surface of the heating element may be hardly formed, bringing about the advantage that the durability of the head can be improved.

Example B1

An aqueous 10% solution of a commercially available dye SPECIAL BLACK 7984 (trade name; available from Bayer Japan Ltd.) was prepared, and then sodium sulfate was added thereto, followed by stirring to salt out the dye. The precipitate formed was collected by filtration, which was then washed with a saturated pure water solution of sodium sulfate, followed by drying.

The dry solid matter obtained was weighed in a stated amount so as to be in a dye concentration of 3% in the resulting ink composition, and this was dissolved in a solution of 3:1 mixture of ethylene glycol and N-methyl-2-pyrrolidone. Next, the solution obtained was pressure filtered with a membrane filter of 1 µm in average pore diameter. To 40 parts of the filtrate thus obtained, 60 parts of water was added, followed by stirring, and the solution formed was passed through a layer of a cation-exchange resin C-464, available from Sumitomo Chemical Co., Ltd. Thereafter, the resulting solution was adjusted to have a pH of 9.2 using triethanolamine, and then left to stand for 10 days in a plastic container. Thereafter, the solution was further filtered with a membrane filter of 0.7 µm to obtain an ink composition. Zinc content in this ink composition was measured using an atomic-absorption spectrophotometer to reveal that it was 0.7 ppm.

Using this ink composition, the following Ta to Tc were examined on a recording apparatus having an on-demand type multi-head that performs recording by imparting heat energy to the ink in the recording head to produce ink droplets (ejection orifice diameter: 35 µm; heating resistor resistance value: 150 ohms; drive voltage: 30 V; frequency: 2 KHz), to find that good results were obtained in all the cases as noted below together.

(Ta) Long-term stability: The ink composition was hermetically enclosed in a heat-resistant glass bottle, and stored at −30° C. or 60° C. for 6 months. Even after such storage, deposition of insoluble matter was not seen, and changes in liquid properties and color tones were also little seen.

(Tb) Ejection stability: The ink composition was continuously ejected in an atmosphere of 5° C., 20° C. or 40° C., for 24 hours for each. Always stable, high-quality recording was performed in all atmospheres.

(Tc) Ejection response: Intermittent ejection at intervals of 1 minute and ejection after leaving for 2 months were examined. In both instances, no clogging occurred at the tips or ink channels of the ink-jet printer head, and stable and uniform recording was performed.

Comparative Example B1

An ink composition was prepared in the same manner as in Example B1 except that the solution was not treated with the cation-exchange resin and was not left to stand. As a result, the zinc content in the ink composition was 2.5 ppm. Using this ink composition, its performances were examined in the same manner as in Example B1. As a result, in respect of Tb, the ink often did not ejected. At that point of time the surface of the heating element was observed using a microscope to confirm that there were deposits.

Example B2

An ink composition was prepared in the same manner as in Example B1, using as the dye a commercially available dye WATER YELLOW 6 (trade name; available from Orient Chemical Industries Ltd.). As a result, the zinc content in the ink composition was 0.9 ppm. Using this ink composition, its performances were examined in the same manner as in Example B1. As a result, like Example B1, good results were obtained.

Comparative Example B2

An ink composition was prepared in the same manner as in Example B2 except that the solution was not treated with the cation-exchange resin and was not left to stand. As a result, the zinc content in the ink composition was 5.3 ppm. Using this ink composition, its performances were examined in the same manner as in Example B1. As a result, in respect of Ta, a small quantity of deposits were seen and the conductivity of the liquid decreased. In respect of Tb, the ink often did not ejected. In respect of Tc, clogging occurred at the tips of the ink-jet printer head when ejected after leaving for 2 months, making the ejection impossible. At that point of time the surface of the heating element was observed using a microscope to confirm that there were deposits.

Example B3

An ink composition was prepared in the same manner as in Example B1, using as the dye a commercially available dye SYRUS SUPRARED F3B (trade name; available from Bayer Japan Ltd.). As a result, the zinc content in the ink composition was 0.07 ppm. Using this ink composition, its performances were examined in the same manner as in Example B1. As a result, like Example B1, good results were obtained.

Comparative Example B3

An ink composition was prepared in the same manner as in Example B3 except that the solution was not treated with the cation-exchange resin and was not left to stand. As a result, the zinc content in the ink composition was 1.8 ppm. Using this ink composition, its performances were examined in the same manner as in Example B1. As a result, in respect of Ta, the color tones changed after storage at −30° C., which changed in a difference of $\Delta E=4.5$. Using this ink composition, printing was tested in the same manner as in Example B3. As a result, the $\Delta E$ of the images obtained changed by 6.0 compared with the case when the ink composition was used before storage. This difference was clearly seen to look at.

Example B4

An ink composition was prepared in the same manner as in Example B1, using as the dye a commercially available dye LEVASEL FAST BLUE HS (trade name; available from Bayer Japan Ltd.). As a result, the zinc content in the ink composition was 0.5 ppm. Using this ink composition, its performances were examined in the same manner as in Example B1. As a result, like Example B1, good results were obtained.

Comparative Example B4

An ink composition was prepared in the same manner as in Example B4 except that the solution was not treated with the cation-exchange resin and was not left to stand. As a result, the zinc content in the ink composition was 2.0 ppm. Using this ink composition, its performances were examined in the same manner as in Example B1. As a result, in respect of Tc, clogging occurred at the tips of the ink-jet printer head when ejected after leaving for 2 months, making the ejection impossible. At that point of time the surface of the heating element was observed using a microscope to confirm that there were deposits.

Example B5

An ink composition was prepared in the same manner as in Example B1, using as the dye a commercially available dye SUPRANOL FAST BLACK VLG (trade name; available from Bayer Japan Ltd.). As a result, the zinc content in the ink composition was 0.1 ppm. Using this ink composition, its performances were examined in the same manner as in Example B1. As a result, like Example B1, good results were obtained.

Comparative Example B5

An ink composition was prepared in the same manner as in Example B5 except that the solution was not treated with the cation-exchange resin and was not left to stand. As a result, the zinc content in the ink composition was 1.9 ppm. Using this ink composition, its performances were examined in the same manner as in Example B1. As a result, in respect of Tb and Tc, the ink often did not ejected when intermittently ejected at intervals of 1 minute. At that point of time the surface of the heating element was observed using a microscope to confirm that there were deposits.

Example B6

Using the ink composition of Example B2 as yellow ink, the ink composition of Example B3 as magenta ink, the ink composition of Example B4 as cyan ink and the ink composition of Example B5 as black ink, full-color photographic images were reproduced on the same ink-jet recording apparatus as used in Examples B2 to B5. Images obtained were very sharp for each color and their colors were well reproduced.

Comparative Example B6

Using the ink composition of Comparative Example B2 as yellow ink, the ink composition of Comparative Example B3 as magenta ink, the ink composition of Comparative Example B4 as cyan ink and the ink composition of Comparative Example B5 as black ink, it was attempted to reproduce full-color photographic images in the same manner as in Example B6. As a result, many blank dots were seen and no sharp images were obtained. Color reproducibility was also poor.

In the ink compositions of Examples B1 to B6, which showed good long-term storage stability and ejection stability and also a good ejection response, the zinc content in the ink composition was less than 1 ppm in all the cases.

On the other hand, in the ink compositions of Comparative Examples B1 to B6, which caused problems in long-term storage stability, ejection stability and ejection response, the zinc content in the ink composition was not less than 1 ppm in all the cases.

As described above, in Examples B1 to B6, since the zinc content in the ink composition was less than 1 ppm, recording ink compositions having superior long-term storage stability, ejection stability and ejection response can be obtained.

In Examples B1 to B6 and Comparative Examples B1 to B6, the ink-jet recording head used was the on-demand type multi-head that performs recording by imparting heat energy to the ink in the recording head to produce ink droplets. Ink compositions having the above conditions were used also in ink-jet heads of the kaiser type disclosed in Japanese Patent Publication No. 53-12138 and the shear mode type disclosed in Japanese Patent Application Laid-open No. 2-150355 to examine ink performances in the same manner as in Examples B1 to B6. As a result, similar results were obtained.

According to the ink compositions of Examples B1 to B6 made up as described above, the zinc content in the ink composition is less than 1 ppm, and hence a good long-term storage stability required for inks can be achieved, and, in ink-jet recording apparatus making use of such ink compositions, ink can be well jetted without causing the clogging of ink jet-out orifices and ink channels.

Example C1

An aqueous 10% solution of a commercially available dye SPECIAL BLACK 7984 (trade name; available from Bayer Japan Ltd.) was prepared, and then sodium sulfate was added thereto, followed by stirring to salt out the dye. The precipitate formed was collected by filtration, which was then washed with a saturated pure water solution of sodium sulfate, followed by drying.

The dry solid matter obtained was weighed in a stated amount so as to be in a dye concentration of 3% in the resulting ink composition, and this was dissolved in a solution of 3:1 mixture of ethylene glycol and N-methyl-2-pyrrolidone. Next, the solution obtained was pressure filtered with a membrane filter of 1 μm in average pore diameter. To 40 parts of the filtrate thus obtained, 60 parts of water was added, followed by stirring, and the solution formed was passed through a layer of a cation-exchange resin C-464, available from Sumitomo Chemical Co., Ltd. Thereafter, the resulting solution was adjusted to have a pH of 9.2 using triethanolamine, and left to stand for 10 days in a plastic container. Thereafter, the solution was further filtered with a membrane filter of 0.7 μm to obtain an ink composition. Nickel content in this ink composition was measured using an atomic-absorption spectrophotometer to reveal that it was 0.02 ppm.

Using this ink composition, like Example B1, the following Ta to Tc were examined on a recording apparatus having an on-demand type multi-head that performs recording by imparting heat energy to the ink in the recording head to produce ink droplets (ejection orifice diameter: 35 μm; heating resistor resistance value: 150 ohms; drive voltage: 30 V; frequency: 2 KHz), to find that good results were obtained in all the cases as noted below together.

(Ta) Long-term stability: The ink composition was hermetically enclosed in a heat-resistant glass bottle, and stored at −30° C. or 60° C. for 6 months. Even after such storage, deposition of insoluble matter was not seen, and changes in liquid properties and color tones were also little seen.

(Tb) Ejection stability: The ink composition was continuously ejected in an atmosphere of 5° C., 20° C. or 40° C., for 24 hours for each. Always stable, high-quality recording was performed in all atmospheres.

(Tc) Ejection response: Intermittent ejection at intervals of 1 minute and ejection after leaving for 2 months were examined. In both instances, no clogging occurred at the tips or ink channels of the ink-jet printer head, and stable and uniform recording was performed.

Comparative Example C1

An ink composition was prepared in the same manner as in Example C1 except that the solution was not treated with the cation-exchange resin and was not left to stand. As a result, the nickel content in the ink composition was 0.15 ppm. Using this ink composition, its performances were examined in the same manner as in Example C1. As a result, in respect of Tb, the ink often did not ejected. At that point of time the surface of the heating element was observed using a microscope to confirm that there were deposits.

Example C2

An ink composition was prepared in the same manner as in Example C1, using as the dye a commercially available dye WATER YELLOW 6 (trade name; available from Orient Chemical Industries Ltd.). As a result, the nickel content in the ink composition was 0.04 ppm. Using this ink composition, its performances were examined in the same manner as in Example C1. As a result, like Example C1, good results were obtained.

Comparative Example C2

An ink composition was prepared in the same manner as in Example C2 except that the solution was not treated with the cation-exchange resin and was not left to stand. As a result, the nickel content in the ink composition was 0.26 ppm. Using this ink composition, its performances were examined in the same manner as in Example C1. As a result, in respect of Ta, a small quantity of deposits were seen and the conductivity of the liquid decreased. In respect of Tb, the ink often did not ejected. In respect of Tc, clogging occurred at the tips of the ink-jet printer head when ejected after leaving for 2 months, making the ejection impossible. At that point of time the surface of the heating element was observed using a microscope to confirm that there were deposits.

Example C3

An ink composition was prepared in the same manner as in Example C1, using as the dye a commercially available dye SYRUS SUPRARED F3B (trade name; available from Bayer Japan Ltd.). As a result, the nickel content in the ink composition was 0.01 ppm. Using this ink composition, its performances were examined in the same manner as in Example C1. As a result, like Example C1, good results were obtained.

Comparative Example C3

An ink composition was prepared in the same manner as in Example C3 except that the solution was not treated with the cation-exchange resin and was not left to stand. As a result, the nickel content in the ink composition was 0.11 ppm. Using this ink composition, its performances were examined in the same manner as in Example C1. As a result, in respect of Ta, the color tones changed after storage at −30° C., which changed in a difference of $\Delta E=6.5$. Using this ink composition, printing was tested in the same manner as in Example C3. As a result, the $\Delta E$ of the images obtained changed by 6.0 compared with the case when the ink composition was used before storage. This difference was clearly seen to look at.

Example C4

An ink composition was prepared in the same manner as in Example C1, using as the dye a commercially available dye LEVASEL FAST BLUE HS (trade name; available from Bayer Japan Ltd.). As a result, the nickel content in the ink composition was 0.02 ppm. Using this ink composition, its performances were examined in the same manner as in Example C1. As a result, like Example C1, good results were obtained.

Comparative Example C4

An ink composition was prepared in the same manner as in Example C4 except that the solution was not treated with the cation-exchange resin and was not left to stand. As a result, the nickel content in the ink composition was 0.13 ppm. Using this ink composition, its performances were examined in the same manner as in Example C1. As a result, in respect of Tc, clogging occurred at the tips of the ink-jet printer head when ejected after leaving for 2 months, making the ejection impossible. At that point of time the surface of the heating element was observed using a microscope to confirm that there were deposits.

Example C5

An ink composition was prepared in the same manner as in Example C1, using as the dye a commercially available dye SUPRANOL FAST BLACK VLG (trade name; available from Bayer Japan Ltd.). As a result, the nickel content in the ink composition was 0.01 ppm. Using this ink composition, its performances were examined in the same manner as in Example C1. As a result, like Example C1, good results were obtained.

Comparative Example C5

An ink composition was prepared in the same manner as in Example C5 except that the solution was not treated with the cation-exchange resin and was not left to stand. As a result, the nickel content in the ink composition was 0.35 ppm. Using this ink composition, its performances were examined in the same manner as in Example C1. As a result, in respect of Tb and Tc, the ink often did not ejected when intermittently ejected at intervals of 1 minute. At that point of time the surface of the heating element was observed using a microscope to confirm that there were deposits.

Example C6

Using the ink composition of Example C2 as yellow ink, the ink composition of Example C3 as magenta ink, the ink composition of Example C4 as cyan ink and the ink composition of Example C5 as black ink, full-color photographic images were reproduced on the same ink-jet recording apparatus as used in Examples C2 to C5. Images obtained were very sharp for each color and their colors were well reproduced.

Comparative Example C6

Using the ink composition of Comparative Example C2 as yellow ink, the ink composition of Comparative Example C3 as magenta ink, the ink composition of Comparative Example C4 as cyan ink and the ink composition of Comparative Example C5 as black ink, it was attempted to reproduce full-color photographic images in the same manner as in Example C6. As a result, many blank dots were seen and no sharp images were obtained. Color reproducibility was also poor.

In the ink compositions of Examples C1 to C6, which showed good long-term storage stability and ejection stability and also a good ejection response, the nickel content in the ink composition was less than 0.05 ppm in all the cases.

On the other hand, in the ink compositions of Comparative Examples C1 to C6, which caused problems in long-term storage stability, ejection stability and ejection response, the nickel content in the ink composition was not less than 0.05 ppm in all the cases.

As described above, in Examples C1 to C6, since the nickel content in the ink composition was less than 0.05 ppm, recording ink compositions having superior long-term storage stability, ejection stability and ejection response can be obtained.

In Examples C1 to C6 and Comparative Examples C1 to C6, the ink-jet recording head used was the on-demand type multi-head that performs recording by imparting heat energy to the ink in the recording head to produce ink droplets. Ink compositions having the above conditions were used also in ink-jet heads of the kaiser type disclosed in Japanese Patent Publication No. 53-12138 and the shear mode type disclosed in Japanese Patent Application Laid-open No. 2-150355 to examine ink performances in the same manner as in Examples C1 to C6. As a result, similar results were obtained.

According to the ink compositions of Examples C1 to C6 made up as described above, the nickel content in the ink composition is less than 0.05 ppm, and hence a good long-term storage stability required for inks can be achieved, and, in ink-jet recording apparatus making use of such ink compositions, ink can be well jetted without causing the clogging of ink jet-out orifices and ink channels. Also, when the ink compositions of Example C1 to C6 are used in the ink-jet recording system utilizing heat energy, the deposits on the surface of the heating element may be hardly formed, bringing about the advantage that the durability of the head can be improved.

Example D1

An aqueous 10% solution of a commercially available dye SPECIAL BLACK 7984 (trade name; available from Bayer Japan Ltd.) was prepared, and then sodium sulfate was added thereto, followed by stirring to salt out the dye. The precipitate formed was collected by filtration, which was then washed with a saturated pure water solution of sodium sulfate, followed by drying.

The dry solid matter obtained was weighed in a stated amount so as to be in a dye concentration of 3% in the resulting ink composition, and this was dissolved in a solution of 3:1 mixture of ethylene glycol and N-methyl-2-pyrrolidone. Next, the solution obtained was pressure filtered with a membrane filter of 1 μm in average pore diameter. To 40 parts of the filtrate thus obtained, 60 parts of water was added, followed by stirring, and the solution formed was passed through a layer of a cation-exchange resin C-464, available from Sumitomo Chemical Co., Ltd. Thereafter, the resulting solution was adjusted to have a pH of 8.5 using triethanolamine. Thereafter, the solution was further filtered with a membrane filter of 0.7 μm to obtain an ink composition. Strontium content in this ink composition was measured using a plasma emission spectroscopic analyzer to reveal that it was 0.007 ppm.

Using this ink composition, like Example B1, the following Ta to Tc were examined on a recording apparatus having an on-demand type multi-head that performs recording by imparting heat energy to the ink in the recording head to produce ink droplets (ejection orifice diameter: 35 μm; heating resistor resistance value: 150 ohms; drive voltage: 30 V; frequency: 2 KHz), to find that good results were obtained in all the cases as noted below together. (Ta) Long-term stability: The ink composition was hermetically enclosed in a heat-resistant glass bottle, and stored at −30° C. or 60° C. for 6 months. Even after such storage, deposition of insoluble matter was not seen, and changes in liquid properties and color tones were also little seen.

(Tb) Ejection stability: The ink composition was continuously ejected in an atmosphere of 5° C., 20° C. or 40° C., for 24 hours for each. Always stable, high-quality recording was performed in all atmospheres.

(Tc) Ejection response: Intermittent ejection at intervals of 1 minute and ejection after leaving for 2 months were examined. In both instances, no clogging occurred at the tips or ink channels of the ink-jet printer head, and stable and uniform recording was performed.

Comparative Example D1

An ink composition was prepared in the same manner as in Example D1 except that the solution was not passed through the cation-exchange resin. As a result, the strontium content in the ink composition was 0.015 ppm. Using this ink composition, its performances were examined in the same manner as in Example D1. As a result, in respect of Tb, the ink often did not ejected. At that point of time the surface of the heating element was observed using a microscope to confirm that there were deposits.

Example D2

An ink composition was prepared in the same manner as in Example D1, using as the dye a commercially available dye WATER YELLOW 6 (trade name; available from Orient Chemical Industries Ltd.). As a result, the strontium content in the ink composition was 0.006 ppm. Using this ink composition, its performances were examined in the same manner as in Example D1. As a result, like Example D1, good results were obtained.

Comparative Example D2

An ink composition was prepared in the same manner as in Example D2 except that the solution was not passed through the cation-exchange resin. As a result, the strontium content in the ink composition was 0.019 ppm. Using this ink composition, its performances were examined in the same manner as in Example D1. As a result, in respect of Ta, a small quantity of deposits were seen and the conductivity of the liquid decreased. In respect of Tb, the ink often did not ejected. In respect of Tc, clogging occurred at the tips of the ink-jet printer head when ejected after leaving for 2 months, making the ejection impossible. At that point of time the surface of the heating element was observed using a microscope to confirm that there were deposits.

Example D3

An ink composition was prepared in the same manner as in Example D1, using as the dye a commercially available dye SYRUS SUPRARED F3B (trade name; available from Bayer Japan Ltd.). As a result, the strontium content in the ink composition was 0.008 ppm. Using this ink composition, its performances were examined in the same manner as in Example D1. As a result, like Example D1, good results were obtained.

Comparative Example D3

An ink composition was prepared in the same manner as in Example D3 except that the solution was not passed through the cation-exchange resin. As a result, the strontium content in the ink composition was 0.015 ppm. Using this ink composition, its performances were examined in the same manner as in Example D1. As a result, in respect of Ta, the color tones changed after storage at $-30°$ C., which changed in a difference of $\Delta E=5.0$. Using this ink composition, printing was tested in the same manner as in Example D3. As a result, the $\Delta E$ of the images obtained changed by 7.5 compared with the case when the ink composition was used before storage. This difference was clearly seen to look at.

Example D4

An ink composition was prepared in the same manner as in Example D1, using as the dye a commercially available dye LEVASEL FAST BLUE HS (trade name; available from Bayer Japan Ltd.). As a result, the strontium content in the ink composition was 0.007 ppm. Using this ink composition, its performances were examined in the same manner as in Example D1. As a result, like Example D1, good results were obtained.

Comparative Example D4

An ink composition was prepared in the same manner as in Example D4 except that the solution was not passed through the cation-exchange resin. As a result, the strontium content in the ink composition was 0.019 ppm. Using this ink composition, its performances were examined in the same manner as in Example D1. As a result, in respect of Tc, clogging occurred at the tips of the ink-jet printer head when ejected after leaving for 2 months, making the ejection impossible. At that point of time the surface of the heating element was observed using a microscope to confirm that there were deposits.

Example D5

An ink composition was prepared in the same manner as in Example D1, using as the dye a commercially available dye SUPRANOL FAST BLACK VLG (trade name; available from Bayer Japan Ltd.). As a result, the strontium content in the ink composition was 0.008 ppm. Using this ink composition, its performances were examined in the same manner as in Example D1. As a result, like Example D1, good results were obtained.

Comparative Example D5

An ink composition was prepared in the same manner as in Example D5 except that the solution was not passed through the cation-exchange resin. As a result, the strontium content in the ink composition was 0.021 ppm. Using this ink composition, its performances were examined in the same manner as in Example D1. As a result, in respect of Tb and Tc, the ink often did not ejected when intermittently ejected at intervals of 1 minute. At that point of time the surface of the heating element was observed using a microscope to confirm that there were deposits.

Example D6

Using the ink composition of Example D2 as yellow ink, the ink composition of Example D3 as magenta ink, the ink composition of Example D4 as cyan ink and the ink composition of Example D5 as black ink, full-color photographic images were reproduced on the same ink-jet recording apparatus as used in Examples D2 to D5. Images obtained were very sharp for each color and their colors were well reproduced.

Comparative Example D6

Using the ink composition of Comparative Example D2 as yellow ink, the ink composition of Comparative Example D3 as magenta ink, the ink composition of Comparative Example D4 as cyan ink and the ink composition of Comparative Example D5 as black ink, it was attempted to reproduce full-color photographic images in the same manner as in Example D6. As a result, many blank dots were seen and no sharp images were obtained. Color reproducibility was also poor.

In the ink compositions of Examples D1 to D6, which showed good long-term storage stability and ejection stability and also a good ejection response, the strontium content in the ink composition was less than 0.01 ppm in all the cases.

On the other hand, in the ink compositions of Comparative Examples D1 to D6, which caused problems in long-term storage stability, ejection stability and ejection response, the strontium content in the ink composition was not less than 0.01 ppm in all the cases.

As described above, in Examples D1 to D6, since the strontium content in the ink composition was less than 0.01 ppm, recording ink compositions having superior long-term storage stability, ejection stability and ejection response can be obtained.

In Examples D1 to D6 and Comparative Examples D1 to D6, the ink-jet recording head used was the on-demand type multi-head that performs recording by imparting heat energy to the ink in the recording head to produce ink droplets. Ink compositions having the above conditions were used also in ink-jet heads of the kaiser type disclosed in Japanese Patent Publication No. 53-12138 and the shear mode type disclosed in Japanese Patent Application Laid-open No. 2-150355 to examine ink performances in the same manner as in Examples D1to D6. As a result, similar results were obtained.

According to the ink compositions of Examples D1to D6 made up as described above, the strontium content in the ink composition is less than 0.01 ppm, and hence a good long-term storage stability required for inks can be achieved, and, in ink-jet recording apparatus making use of such ink compositions, ink can be well jetted without causing the clogging of ink jet-out orifices and ink channels. Also, ink compositions with a superior stability can be provided, which may cause no deposits on heating elements of ink-jet printers that utilize heat energy.

Example E1

An aqueous 10% solution of a commercially available dye SYRUS SUPRARED F3B (trade name; available from Bayer Japan Ltd.) was prepared, and then sodium sulfate was added to the aqueous solution, followed by stirring to salt out the dye. The precipitate formed was collected by filtration, which was then washed with a saturated pure water solution of sodium sulfate, followed by drying.

The dry solid matter obtained was weighed in a stated amount so as to be in a dye concentration of 3% in the resulting ink composition, and this was dissolved in a solution of 3:1 mixture of ethylene glycol and N-methyl-2-pyrrolidone. Next, the solution obtained was pressure filtered with a membrane filter of 0.8 µm in average pore diameter. Thereafter the filtrate formed was hermetically enclosed in a plastic container, and left to stand for 3 days in a cool and dark place. Then, the resulting filtrate was again filtered with a membrane filter of 0.8 µm. To 40 parts of the filtrate thus obtained, 60 parts of water was added to obtain an ink composition.

Subsequently, the ink composition was passed through a layer of a cation-exchange resin C-464, available from Sumitomo Chemical Co., Ltd. Thereafter, the solution having been passed therethrough was adjusted to have a pH of 9.8 using an aqueous 0.1N sodium hydroxide solution. All the containers and implements used in the preparation of the ink composition were all made of materials containing no iron (e.g., glass, Teflon, polyethylene or polypropylene), and were used after they were thoroughly cleaned with washing water and rinsed with pure water, followed by complete drying.

Iron content in this ink composition was measured using a plasma emission spectroscopic analyzer ICPS-1000-4, trade name, manufactured by Shimadzu Corporation to reveal that it was 0.2 ppm.

Using this ink composition, like Example A1, the following T1 to T5 were examined on a recording apparatus having an on-demand type multi-head that performs recording by imparting heat energy to the ink in the recording head to produce ink droplets (ejection orifice diameter: 35 µm; heating resistor resistance value: 150 ohms; drive voltage: 30 volts; frequency: 2 KHz) and a recording apparatus having an on-demand type multi-head that performs recording by imparting pressure produced by piezoelectric vibration, to the ink in the recording head to produce ink droplets (ejection orifice diameter: 40 µm; drive voltage: 30 volts; frequency: 10 KHz), to find that good results were obtained in all the cases as noted below together.

(T1) Long-term stability: The ink composition was hermetically enclosed in a bag made of plastic film, and stored at −30° C. or 60° C. for 6 months. Even after such storage, deposition of insoluble matter was not seen, and any changes in liquid properties and color tones were also not seen.

(T2) Ejection stability: The ink composition was continuously ejected in an atmosphere of room temperature, 5° C. or 40° C., for 24 hours for each. Always stable, high-quality recording was performed in all atmospheres.

(T3) Ejection response: Ejection intermittently carried out at intervals of 2 second and ejection after leaving for 2 months were examined. In both instances, no clogging occurred at the orifice tips, and stable and uniform recording was performed.

(T4) Quality of recorded images: Images recorded on the recording mediums shown below had a high density and were sharp. After the images were exposed to room light for 6 months, their densities decreased by 1% or less.
Recording mediums:

Woodfree paper GINKAN, trade name, available from Sanyo Pulp Co., Ltd.

Woodfree paper SEVEN STAR, trade name, available from Hokuetsu Paper Co., Ltd.

Mechanical woodpulp paper HAKUBOTAN, trade name, available from Honshu Paper Co., Ltd.

Non-size paper TOYO ROSHI No.4, trade name, available from Toyo Roshi Co., Ltd.

(T5) Fixing performance on each kind of recording medium: Five seconds after printing on the recording medium shown in the above (T4), print areas were rubbed with fingers to examine whether or not images were rubbed off or blurred. As the result, images were neither rubbed off nor blurred in all instances, showing a superior fixing performance.

Examples E2 to E4

Ink compositions were prepared in the same manner as in Example E1 except that the following commercially available dyes were used, and T1 to T5 of the respective ink compositions were examined in the same manner as in Example E1. Like those in Example E1, these ink compositions showed good results.

Example E2

WATER YELLOW 6 (trade name; available from Orient Chemical Industries Ltd.). Iron content in the ink composition, controlled to 0.1 ppm.

Example E3

LEVASEL FAST BLUE KS6GLL (trade name; available from Bayer Japan Ltd.). Iron content in the ink composition, controlled to 0.2 ppm.

Example E4

SPECIAL BLACK 7984 (trade name; available from Bayer Japan Ltd.). Iron content in the ink composition, controlled to 0.1 ppm.

Example E5

Using respectively the ink composition of Example E1 as magenta ink, the ink composition of Example E2 as yellow ink, the ink composition of Example E3 as cyan ink and the ink composition of Example E4 as black ink, full-color photographic images were reproduced on the same ink-jet recording apparatus as used in Examples E1 to E4. Images obtained were very sharp and their colors were well reproduced.

Example E6

Pigment carbon black and a 100-fold amount of pure water were stirred for 1 hour, and the mixture was filtered three times, followed by drying. Using this filtered product, a liquid composition having the composition shown below was prepared, and was subjected to dispersion by means of a dispersion machine PEARL MILL (trade name, manufactured by Ashizawa K. K.) to obtain a dispersion.

As grinding media put in the dispersion machine, zirconia beads were used. At the parts coming in contact with liquid in the dispersion machine, those subjected to ceramic coating were used. Other containers and implements were those made of the same material as in Example E1, and were used after they were cleaned and then rinsed with pure water, followed by complete drying.

| Liquid composition: | |
|---|---|
| Carbon black (MA-7, available from Mitsubishi Chemical Industries Limited) | 10% |
| Styrene-maleic anhydride copolymer (molecular weight: 10,000; acid value: 175) | 7% |
| Glycerol | 5% |
| NIKKOL TS-30 (trade name; available from Nikko Chemicals | 2% |

-continued

| Liquid composition: | |
|---|---|
| Co., Ltd.) | |
| Pure water | 75% |
| Triethanolamine | 1% |

Next, this dispersion was treated by a centrifugal separator to remove coarse particles, and then the resulting dispersion was subjected to pressure filtration with a membrane filter of 1 μm in average pore diameter. Thereafter the filtrate formed was hermetically enclosed in a plastic container, and left to stand for 3 days in a cool and dark place. Then, the resulting filtrate was again filtered with a membrane filter of 1 μm to obtain an ink composition. Iron content in the ink composition thus prepared was measured in the same manner as in Example E1 to reveal that it was 0.2 ppm. T1 to T5 of this ink composition were examined in the same manner as in Example E1. Like those in Example E1, the ink composition showed good results.

Comparative Examples E1 to E4

Using the same commercially available dyes as used in Examples E1 to E4, ink compositions were prepared in the same manner as in Example E1 except that the filtration and the re-filtration in the preparation of the ink composition were carried out using a membrane filter of 2 μm in average pore diameter. In the preparation of the ink compositions, containers made of stainless steel were used, containing iron.

T1 to T5 of the respective ink compositions thus prepared were examined in the same manner as in Example E1. As the result, deposition of insoluble matter was slightly seen in respect of T1. In respect of T3, clogging, curved jets and changes in flying speed were observed in the ejection after leaving for 2 months, and the original state was not restorable even though printing was continued.

Comparative Example E1

SYRUS SUPRARED F3B (trade name; available from Bayer Japan Ltd.). Iron content in the ink composition, 3 ppm.

Comparative Example E2

WATER YELLOW 6 (trade name; available from Orient Chemical Industries Ltd.). Iron content in the ink composition, 4 ppm.

Comparative Example E3

LEVASEL FAST BLUE KS6GLL (trade name; available from Bayer Japan Ltd.). Iron content in the ink composition, 2 ppm.

Comparative Example E4

SPECIAL BLACK 7984 (trade name; available from Bayer Japan Ltd.). Iron content in the ink composition, 4 ppm.

As is clear from the foregoing description, in the case of the ink compositions of Example E1 to E6 and the ink-jet recording carried out using them, iron contained in the ink compositions is in a content not more than 0.3 ppm. Hence, good printing can be enjoyed without causing the clogging of nozzles or orifices and the faulty prints due to a curved jet, a change in ink drop quantity and a change in flying speed, when the ink composition are used, when stored for a long term and even when undergo changes in temperature and environment. Also, when the ink compositions of Example E1 to A6 are used in the ink-jet recording system utilizing heat energy, the deposits on the surface of the heating element may be hardly formed, bringing about the advantage that the durability of the head can be improved.

Example F1

An aqueous 10% solution of a commercially available dye SPECIAL BLACK 7984 (trade name; available from Bayer Japan Ltd.) was prepared, and then sodium sulfate was added thereto, followed by stirring to salt out the dye. The precipitate formed was collected by filtration, which was then washed with a saturated pure water solution of sodium sulfate, followed by drying.

The dry solid matter obtained was weighed in a stated amount so as to be in a dye concentration of 3% in the resulting ink composition, and this was dissolved in a solution of 3:1 mixture of ethylene glycol and N-methyl-2-pyrrolidone. Next, the solution obtained was pressure filtered with a membrane filter of 1 μm in average pore diameter. To 40 parts of the filtrate thus obtained, 60 parts of water was added, followed by stirring, and the solution formed was passed through a layer of a cation-exchange resin C-464, available from Sumitomo Chemical Co., Ltd. Thereafter, the resulting solution was adjusted to have a pH of 8.6 using triethanolamine, and left to stand for 3 days in a plastic container. Thereafter, the solution was further filtered with a membrane filter of 0.7 μm to obtain an ink composition. Silicon content in this ink composition was measured using an atomic-absorption spectrophotometer to reveal that it was 1.4 ppm.

Using this ink composition, like Example B1, the following Ta to Tc were examined on a recording apparatus having an on-demand type multi-head that performs recording by imparting heat energy to the ink in the recording head to produce ink droplets (ejection orifice diameter: 35 μm; heating resistor resistance value: 150 ohms; drive voltage: 30 V; frequency: 2 KHz), to find that good results were obtained in all the cases as noted below together.

(Ta) Long-term stability: The ink composition was hermetically enclosed in a heat-resistant glass bottle, and stored at −30° C. or 60° C. for 6 months. Even after such storage, deposition of insoluble matter was not seen, and changes in liquid properties and color tones were also little seen.

(Tb) Ejection stability: The ink composition was continuously ejected in an atmosphere of 5° C., 20° C. or 40° C., for 24 hours for each. Always stable, high-quality recording was performed in all atmospheres.

(Tc) Ejection response: Intermittent ejection at intervals of 1 minute and ejection after leaving for 2 months were examined. In both instances, no clogging occurred at the tips or ink channels of the ink-jet printer head, and stable and uniform recording was performed.

Comparative Example F1

An ink composition was prepared in the same manner as in Example F1 except that the solution was not left to stand. As a result, the silicon content in the ink composition was 3.3 ppm. Using this ink composition, its performances were examined in the same manner as in Example F1. As a result, in respect of Tb, the ink often did not ejected. At that point of time the surface of the heating element was observed using a microscope to confirm that there were deposits.

Example F2

An ink composition was prepared in the same manner as in Example F1, using as the dye a commercially available dye WATER YELLOW 6 (trade name; available from Orient Chemical Industries Ltd.). As a result, the silicon content in the ink composition was 1.1 ppm. Using this ink composition, its performances were examined in the same manner as in Example F1. As a result, like Example F1, good results were obtained.

Comparative Example F2

An ink composition was prepared in the same manner as in Example F2 except that the solution was not left to stand. As a result, the silicon content in the ink composition was 5.4 ppm. Using this ink composition, its performances were examined in the same manner as in Example F1. As a result, in respect of Ta, a small quantity of deposits were seen and the conductivity of the liquid decreased. In respect of Tb, the ink often did not ejected. In respect of Tc, clogging occurred at the tips of the ink-jet printer head when ejected after leaving for 2 months, making the ejection impossible. At that point of time the surface of the heating element was observed using a microscope to confirm that there were deposits.

Example F3

An ink composition was prepared in the same manner as in Example F1, using as the dye a commercially available dye SYRUS SUPRARED F3B (trade name; available from Bayer Japan Ltd.). As a result, the silicon content in the ink composition was 0.1 ppm. Using this ink composition, its performances were examined in the same manner as in Example F1. As a result, like Example F1, good results were obtained.

Comparative Example F3

An ink composition was prepared in the same manner as in Example F3 except that the solution was not left to stand. As a result, the silicon content in the ink composition was 2.7 ppm. Using this ink composition, its performances were examined in the same manner as in Example F1. As a result, in respect of Ta, the color tones changed after storage at $-30°$ C., which changed in a difference of $\Delta E=4.4$. Using this ink composition, printing was tested in the same manner as in Example F3. As a result, the $\Delta E$ of the images obtained changed by 5.8 compared with the case when the ink composition was used before storage. This difference was clearly seen to look at.

Example F4

An ink composition was prepared in the same manner as in Example F1, using as the dye a commercially available dye LEVASEL FAST BLUE HS (trade name; available from Bayer Japan Ltd.). As a result, the silicon content in the ink composition was 0.7 ppm. Using this ink composition, its performances were examined in the same manner as in Example F1. As a result, like Example F1, good results were obtained.

Comparative Example F4

An ink composition was prepared in the same manner as in Example F4 except that the solution was not left to stand. As a result, the silicon content in the ink composition was 3.1 ppm. Using this ink composition, its performances were examined in the same manner as in Example F1. As a result, in respect of Tc, clogging occurred at the tips of the ink-jet printer head when ejected after leaving for 2 months, making the ejection impossible. At that point of time the surface of the heating element was observed using a microscope to confirm that there were deposits.

Example F5

An ink composition was prepared in the same manner as in Example F1, using as the dye a commercially available dye SUPRANOL FAST BLACK VLG (trade name; available from Bayer Japan Ltd.). As a result, the silicon content in the ink composition was 0.2 ppm. Using this ink composition, its performances were examined in the same manner as in Example F1. As a result, like Example F1, good results were obtained.

Comparative Example F5

An ink composition was prepared in the same manner as in Example F5 except that the solution was not treated with the cation-exchange resin and was not left to stand. As a result, the silicon content in the ink composition was 2.6 ppm. Using this ink composition, its performances were examined in the same manner as in Example F1. As a result, in respect of Tb and Tc, the ink often did not ejected when intermittently ejected at intervals of 1 minute. At that point of time the surface of the heating element was observed using a microscope to confirm that there were deposits.

Example F6

Using the ink composition of Example F2 as yellow ink, the ink composition of Example P3 as magenta ink, the ink composition of Example F4 as cyan ink and the ink composition of Example F5 as black ink, full-color photographic images were reproduced on the same ink-jet recording apparatus as used in Examples F2 to F5. Images obtained were very sharp for each color and their colors were well reproduced.

Comparative Example F6

Using the ink composition of Comparative Example F2 as yellow ink, the ink composition of Comparative Example F3 as magenta ink, the ink composition of Comparative Example F4 as cyan ink and the ink composition of Comparative Example F5 as black ink, it was attempted to reproduce full-color photographic images in the same manner as in Example F6. As a result, many blank dots were seen and no sharp images were obtained. Color reproducibility was also poor.

In the ink compositions of Examples F1 to F6, which showed good long-term storage stability and ejection stability and also a good ejection response, the silicon content in the ink composition was less than 1.5 ppm in all the cases.

On the other hand, in the ink compositions of Comparative Examples F1 to F6, which caused problems in long-term storage stability, ejection stability and ejection response, the silicon content in the ink composition was not less than 1.5 ppm in all the cases.

As described above, in Examples F1 to F6, since the silicon content in the ink composition was less than 1.5 ppm, recording ink compositions having superior long-term storage stability, ejection stability and ejection response can be obtained.

In Examples F1 to F6 and Comparative Examples F1 to F6, the ink-jet recording head used was the on-demand type multi-head that performs recording by imparting heat energy to the ink in the recording head to produce ink droplets. Ink compositions having the above conditions were used also in ink-jet heads of the kaiser type disclosed in Japanese Patent Publication No. 53-12138 and the shear mode type disclosed in Japanese Patent Application Laid-open No. 2-150355 to examine ink performances in the same manner as in Examples F1 to F6. As a result, similar results were obtained.

According to the ink compositions of Examples F1 to F6 made up as described above, the silicon content in the ink composition is less than 1.5 ppm, and hence a good long-term storage stability required for inks can be achieved, and, in ink-jet recording apparatus making use of such ink compositions, ink can be well jetted without causing the clogging of ink jet-out orifices and ink channels. Also, ink compositions with a superior stability can be provided, which may cause no deposits on heating elements of ink-jet printers that utilize heat energy.

What is claimed is:

1. An ink composition comprising a water-soluble dye or a pigment, dissolved or dispersed in an aqueous medium, wherein the ink composition fulfills all of the following conditions 1 to 6 in respect of the concentration of metals contained therein:

Condition 1; Barium concentration, not more than 4 ppm

Condition 2; Zinc concentration, less than 1 ppm

Condition 3; Nickel concentration, less than 0.05 ppm

Condition 4; Strontium concentration, less than 0.01 ppm

Condition 5; Iron concentration, not more than 0.3 ppm

Condition 6; Silicon concentration, less than 1.5 ppm.

2. An ink composition comprising a water-soluble dye or a pigment, dissolved or dispersed in an aqueous medium, wherein the ink composition has a barium concentration of not more than 4 ppm.

3. The ink composition according to claim 2, wherein the barium concentration is not more than 0.01 ppm.

4. An ink composition comprising a water-soluble dye or a pigment, dissolved or dispersed in an aqueous medium, wherein the ink composition has a zinc concentration of less than 1 ppm.

5. An ink composition comprising a water-soluble dye or a pigment, dissolved or dispersed in an aqueous medium, wherein the ink composition has a nickel concentration of less than 0.05 ppm.

6. An ink composition comprising a water-soluble dye or a pigment, dissolved or dispersed in an aqueous medium, wherein the ink composition has a strontium concentration of less than 0.01 ppm.

7. The ink composition according to claim 1, wherein the barium concentration is not more than 0.01 ppm.

8. The ink composition according to claim 1, wherein said dye or pigment is contained in an amount of from 0.1% by weight to 20% by weight based on the weight of the ink composition.

9. The ink composition according to claim 1, wherein said aqueous medium is a mixed solvent of water and a water-soluble organic solvent.

10. The ink composition according to claim 9, wherein said water is deionized water.

11. A process for preparing an ink composition comprising a water-soluble dye or a pigment, dissolved or dispersed in an aqueous medium; said process comprising the steps of dissolving or dispersing the water-soluble dye or the pigment in the aqueous medium, and subjecting the resulting solution or dispersion to a cation-exchange treatment by the use of a cation-exchange resin to obtain an ink composition according to claim 1.

12. An ink-jet recording process comprising jetting an ink composition according to claim 1 to a recording medium in the form of droplets to make a record.

13. The ink-jet recording process according to claim 12, wherein said jetting utilizes the vibration of a piezoelectric device.

14. The ink-jet recording process according to claim 12, wherein said jetting is by the action of heat energy.

* * * * *